United States Patent [19]

Neal et al.

[11] Patent Number: 5,858,554

[45] Date of Patent: *Jan. 12, 1999

[54] PAPER PRODUCT COMPRISING ADHESIVELY JOINED PLIES

[75] Inventors: Charles William Neal; George Vincent Wegele; Timothy Jude Lorenz, all of Cincinnati, Ohio

[73] Assignee: The Procter & Gamble Company, Cincinnati, Ohio

[*] Notice: The term of this patent shall not extend beyond the expiration date of Pat. No. 5,693,406.

[21] Appl. No.: 835,039

[22] Filed: Mar. 27, 1997

Related U.S. Application Data

[63] Continuation of Ser. No. 524,316, Sep. 19, 1995, abandoned, and a continuation-in-part of Ser. No. 519,472, Aug. 25, 1995, Pat. No. 5,693,406.

[51] Int. Cl.$^6$ ..................................................... B32B 29/06
[52] U.S. Cl. ....................... 428/537.5; 428/174; 428/179; 428/195; 428/198; 428/478.8; 428/511; 162/158
[58] Field of Search .................................... 428/194, 195, 428/198, 261, 411.1, 478.8, 486, 537.5, 174, 179, 511; 162/158

[56] References Cited

U.S. PATENT DOCUMENTS

| | | | |
|---|---|---|---|
| 3,994,771 | 11/1976 | Morgan, Jr. et al. | 161/113 |
| 4,064,213 | 12/1977 | Lazorisak et al. | 264/134 |
| 4,501,640 | 2/1985 | Soerens | 162/111 |
| 4,528,316 | 7/1985 | Soerens | 524/503 |
| 4,788,243 | 11/1988 | Soerens | 524/503 |
| 4,994,146 | 2/1991 | Soerens | 162/112 |
| 5,143,776 | 9/1992 | Givens | 482/194 |
| 5,382,323 | 1/1995 | Furman, Jr. et al. | 162/111 |
| 5,468,796 | 11/1995 | Chen et al. | 524/377 |
| 5,693,406 | 12/1997 | Wegele | 428/179 |

FOREIGN PATENT DOCUMENTS

| | | |
|---|---|---|
| 0 542 543 | 5/1993 | European Pat. Off. . |
| 62-257498 | 11/1987 | Japan . |
| 05-193250 | 8/1993 | Japan . |
| WO93/21279 | 10/1993 | WIPO . |

OTHER PUBLICATIONS

International Search Report;Patent Cooperation Treaty;Jan. 17, 1997

*Primary Examiner*—Marie Yamnitzky
*Attorney, Agent, or Firm*—Bart S. Hersko; Julia A. Glazer; Larry L. Huston

[57] ABSTRACT

A multi-ply paper product wherein the plies are adhesively joined together. One or both of the plies may have embossments protruding towards and contacting the other ply. The plies are adhesively joined, preferably at such embossments. The adhesive is selected from a composition that advantageously provides a minimum wet ply bond strength and a dry ply bond strength which falls within a particularly desired range.

15 Claims, No Drawings

PAPER PRODUCT COMPRISING ADHESIVELY JOINED PLIES

This is a continuation of application Ser. No. 08/524,316, filed on Sep. 19, 1995, now abandoned.

This application is also a continuation-in-part of commonly assigned patent application Ser. No. 519,472 filed Aug. 25, 1995, now U.S. Pat. No. 5,693,406, issued Dec. 2, 1997.

FIELD OF THE INVENTION

The present invention relates to cellulosic fibrous structures such as paper products, and more particularly to paper products having multiple plies which are adhesively joined together.

BACKGROUND OF THE INVENTION

Paper products are well known in everyday life. Paper products are frequently referred to as tissue, and are used for paper toweling, facial tissue, and bath tissue.

Tissue paper products may comprise a single ply, but frequently comprise two or more plies. As used herein, a "ply" refers to a single sheet taken off a forming wire, or the equivalent thereof, and dried without additional fibers being added thereto.

Of course, a ply may be layered with different cellulosic fibers. Layering provides the benefits that a central layer may comprise relatively strong fibers to impart strength to the tissue paper product. Outboard of the central layer may be shorter fibers which impart a soft tactile sensation to the user. Layering may be advantageously accomplished by commonly assigned U.S. Pat. No. 3,994,771, issued Nov. 30, 1976 to Morgan, Jr. et al., which patent is incorporated herein by reference.

Frequently, two or more plies are joined together to make the paper product. Joining multiple plies together provides the advantage that the resulting laminate has a lesser bending modulus than a single ply of equivalent thickness. This provides the benefit that, again, a softer tactile sensation is perceived by the user. Absorbency and caliper are typically improved as well. Furthermore, joining three plies together allows the paper product to have different central and outboard plies in the laminate, to provide strength and softness respectively.

Multi-ply tissue products are typically cellulosic. As used herein, "cellulosic" refers to a paper product comprising at least about fifty weight percent or at least about fifty volume percent cellulosic fibers including, but not limited to, cotton linters, rayon, bagasse, and more preferably wood pulps, such as softwoods (gymnosperms or coniferous) or hardwoods (angiosperms or deciduous), which fibers may be recycled. The balance of the fibers may be synthetic, such as polyolefin or polyester.

Cellulosic plies are frequently joined together by the use of an adhesive. Adhesive joining of cellulosic plies is advantageously described in commonly assigned U.S. Pat. No. 5,143,776, issued Sep. 1, 1992 to Givens, which patent is incorporated herein by reference.

However, adhesive joining of multiple cellulosic plies in a paper product can, and has, led to unsatisfactory performance. Particularly, paper products used as paper toweling, facial tissue, and bath tissue must have the proper ply bond strength. As used herein, "ply bond strength" refers to the force necessary to separate two adjacent plies from one another as described below.

Frequently tissue paper products, particularly paper toweling, are wetted in use. If the wet ply bond strength is insufficient, the plies separate in use and the paper product is destroyed. While it would seem an easy matter to simply increase the wet ply bond strength, the dry ply bond strength is directly coupled to the wet ply bond strength. In the prior art, as the wet ply bond strength increases to the proper level, the dry ply bond strength becomes too great. When the dry ply bond strength is too great, the softness and absorbency are typically reduced.

Accordingly it is an object of this invention to provide a multi-ply paper product. It is further an object of this invention to provide a multi-ply paper towel product having adequate wet ply bond strength without having a dry ply bond strength which is too great. Finally it is an object of this invention to provide such a paper product which is cellulosic and has the plies adhesively joined.

SUMMARY OF THE INVENTION

The present invention provides a multi-ply cellulosic paper product comprising at least two macroscopically monoplanar plies joined in face-to-face relationship. The plies are joined to one another using an aqueous adhesive composition, said aqueous adhesive composition comprising a mixture of:

(a) from about 2% to about 6% by weight of a water-soluble or water dispersable dry strength binder material selected from the group consisting of polyvinyl alcohol, starch based resins, and mixtures thereof;

(b) from about 1% to about 9% by weight of a water-soluble cationic resin selected from the group consisting of polyamide-epichlorohydrin resins, glyoxalated polyacrylamide resins, polyethyleneimine resins, and mixtures thereof; and (c) from about 89% to about 95% by weight water.

Wherein the total solids content of the aqueous adhesive composition ranges from about 5% to about 11% by weight, preferably from about 5% to about 8% by weight, the solids content being the combined weight percents of the water-soluble/dispersable dry strength binder material and the water-soluble wet strength resin.

The aqueous adhesive composition of the present invention is in the form of a solution or stable dispersion.

Preferably, the water-soluble/dispersable dry strength binder material is polyvinyl alcohol and the water-soluble wet strength resin is a polyamide-epichlorohydrin resin.

Preferably, at least one of the plies has embossments thereon, with the embossments extending outwardly from the plane of the ply towards and contacting the opposite ply. The plies are preferably joined together at said embossments with an aqueous adhesive composition, described in detail hereinafter. Preferably, the aqueous adhesive composition is applied to the paper product at a level of from about 3 to about 85 grams per 3,000 square feet.

The paper product preferably has a wet ply bond strength of at least 4.5 grams per inch, and more preferably at least 5.0 grams per inch. The paper product further has a dry ply bond strength preferably from 4.0 to 20.0 grams per inch, and more preferably from 5.0 to 15.0 grams per inch. The paper product may comprise two, three, or more plies. Thus, the paper product according to the present invention has decoupled wet ply bond strength and dry ply bond strength contrary to the prior art.

All percentages, ratios, and proportions herein are by weight unless otherwise specified.

The present invention is described in more detail below.

DETAILED DESCRIPTION OF THE INVENTION

While this specification concludes with claims particularly pointing out and distinctly claiming the subject matter regarded as the invention, it is believed that the invention can be better understood from a reading of the following detailed description and of the appended example.

As used herein, the term "comprising" means that the various components, ingredients, or steps, can be conjointly employed in practicing the present invention. Accordingly, the term "comprising" encompasses the more restrictive terms "consisiting essentially of" and "consisting of".

The present invention comprises a laminate of two or more macroscopically monoplanar plies. The plies are cellulosic, as described below, and may be made according to the same manufacturing process, or according to different manufacturing processes.

Each ply may have a plurality of embossments protruding outwardly from the plane of the ply towards the adjacent ply. The adjacent ply likewise may have opposing protuberances protruding towards the first ply. If a three ply paper product is desired, the central ply may have embossments extending outwardly in both directions, although a central ply having no embossments or unidirectional embossments may be feasible.

The plies may be made according to commonly assigned U.S. Pat. No. 4,637,859, issued Jan. 20, 1987 to Trokhan; or U.S. Pat. No. 4,191,609, issued Mar. 4, 1980 to Trokhan, which patents are incorporated herein by reference. Alternatively, the plies may be conventionally dried using felts.

For the present invention, each ply may have a basis weight of about 8 to 30, and preferably 11 to 18 pounds per 3,000 square feet, and preferably has a composition of hardwood and/or softwood processed by any of the means well known in the art.

After the papermaking process which forms the ply is complete, either or both plies may be embossed. Embossing may be accomplished according to the knob-to-knob embossing process illustrated by commonly assigned U.S. Pat. No. 3,414,459, issued Dec. 3, 1968 to Wells; the nested embossing process illustrated in U.S. Pat. No. 3,556,907, issued Jan. 19, 1971 to Nystrand; or a dual ply process illustrated in commonly assigned U.S. Pat. No. 5,294,475, issued Mar. 15, 1994 to McNeil, all of which patents are incorporated herein by reference.

For the embodiments described and claimed herein, the embossments may be spaced on a pitch of 0.05 to 0.70 inches and may have an area at the distal end ranging from 0.001 to 0.100 square inches. Each embossment may be made on a roll having knobs which protrude 0 to 0.120 inches from the plane of the roll. The embossments may be round, oval shaped, or irregularly shaped.

The fibers comprising the plies of the paper product are preferably cellulosic, such as cotton linters, rayon or bagasse; and more preferably are wood pulp, such as soft woods (gymnosperms or coniferous) or hard woods (angiosperms or deciduous). As used herein, a laminated paper product is considered "cellulosic" if the laminated paper product comprises at least about 50 weight percent or at least about 50 volume percent cellulosic fibers, including but not limited to those fibers listed above. The balance of the fibers comprising the laminated paper product may be synthetic, such as polyolefin or polyester. A cellulosic mixture of wood pulp fibers comprising softwood fibers having a length of about 2.0 to about 4.5 millimeters and a diameter of about 25 to about 50 micrometers, and hardwood fibers having a length of less than about 1.7 millimeters and a diameter of about 12 to about 25 micrometers has been found to work well for the laminated paper products described herein.

If wood pulp fibers are selected for the multi-ply paper products of the present invention, the fibers may be produced by any pulping process including chemical processes, such as sulfite, sulfate and soda processes; and mechanical processes such as stone groundwood. Alternatively, the fibers may be produced by combinations of chemical and mechanical processes or may be recycled. The type, combination, and processing of the fibers used are not critical to the present invention. The hardwood and softwood fibers may be layered throughout the thickness of the laminated paper products or homogeneously blended therein.

Adhesive Composition

The plies of the multi-ply paper product are adhesively joined together. The adhesive composition is preferably applied to the embossments of at least one ply. Of course, the adhesive can be applied to the embossments of both plies. A suitable adhesive utilizes a mixture of a dry strength binder (e.g., a fully hydrolyzed polyvinyl alcohol adhesive) and a wet strength resin (e.g., a thermosetting cationic resin). The dry strength binder and wet strength resin are provided in an 89 to 95 percent aqueous solution or stable dispersion (i.e., 89 to 95 percent water), and preferably about a 92 to 95 percent aqueous solution or stable dispersion (i.e., 92 to 95 percent water). Of the 5 to 11 percent total solids in the adhesive composition specified above, 2 to 6 percent of the total solids may comprise the dry strength binder solids. At least one percent of the total solids comprises the wet strength resin. Each of these types of compounds will be described in detail below.

Dry Strength Binder Materials

The adhesive composition of the present invention contains as an essential component from about 2% to about 6%, preferably from about 3.5% to about 6.0% by weight of a dry strength binder material chosen from the following group of materials: polyacrylamide (such as ACCOSTRENGTH 711 produced by CyTec Industries of West Paterson, N.J.); starch (such as REDIBOND 5320, 2005, and 3030) available from National Starch and Chemical Company, Bridgewater, N.J., or AMYLOSE 1100, 2200 or SALVITOSE available from Avebe Starch; polyvinyl alcohol (such as EVANOL 71-30, supplied by the DuPont Corporation of Wilmington, Del.); and/or guar or locust bean gums. Preferably, the dry strength binder materials are selected from the group consisting of polyvinyl alcohol, starch based resins, and mixtures thereof. The dry strength binder materials act to ensure that the multi-ply paper products of the present invention have adequate dry ply bond strength.

The polyvinyl alcohol component can be of any water-soluble or water-dispersable molecular weight sufficient to form an adhesive film. Generally, a weight average molecular weight of from about 40,000 to about 120,000, more preferably from 70,000 to 90,000 is preferred. Polyvinyl alcohol in solid form is commercially available under several trademarks such as EVANOL (DuPont), GELVATOL® (Monsanto) VINOL® (Air Products) and POVAL® (KURARAY), These grades have a degree of hydrolysis ranging from about 80 to about 100%. Those skilled in the art will appreciate that lowering the degree of hydrolysis and the molecular weight will improve water solubility but will reduce adhesion. Therefore the properties of the polyvinyl alcohol will have to be optimized for the specific application. A particularly preferred polyvinyl alcohol is EVANOL 71-30, supplied by the DuPont Corporation of Wilmington, Delaware. EVANOL 71-30 has a molecular weight of about 77,000 and degree of hydrolsis of about 99%.

In general, suitable starch for practicing the present Invention is characterized by water solubility or stable dispersions and hydrophilicity. Exemplary starch materials include corn starch and potato starch, albeit it is not intended to thereby limit the scope of suitable starch materials; and waxy corn starch that is known industrially as amioca starch is preferred. Amioca starch differs from common corn starch in that it is entirely amylopectin, whereas common corn starch contains both amplopectin and amylose. Various unique characteristics of amioca starch are further described in "Amioca—The Starch from Waxy Corn", H. H. Schopmeyer, Food Industries, December 1945, pp. 106–108 (Vol. pp. 1476–1478). The starch can be in granular or dispersed form. REDIBOND comes as a dispersed ready to use material. Granular starches such as AMYLOSE 1100 are preferably sufficiently cooked to induce swelling of the granules. More preferably, the starch granules are swollen, as by cooking, to a point just prior to dispersion of the starch granule. Such highly swollen starch granules shall be referred to as being "fully cooked". The conditions for dispersion in general can vary depending upon the size of the starch granules, the degree of crystallinity of the granules, and the amount of amylose present. Fully cooked amioca starch, for example, can be prepared by heating an aqueous slurry of about 4× consistency of starch granules at about 190° F. (about 88 ° C.) for between about 30 and about 40 minutes. Other exemplary starch materials which may be used include modified cationic or anionic starches such as those modified to have nitrogen containing groups such as amino groups and methylol groups attached to nitrogen, available from National Starch and Chemical Company, (Bridgewater, N.J.). Considering that such modified starch materials are more expensive than unmodified starches, the latter have generally been preferred.

Wet Strength Resin Materials

The adhesive composition of the present invention contains as an essential component from about 1% to about 9%, preferably from about 1% to about 3% by weight of a wet strength resin material chosen from the following group of materials: polyamide-epichlorohydrin resins, glyoxalated polyacrylamides resins, styrene-butadiene latexes; insolubilized polyvinyl alcohol; urea-formaldehyde; polyethyleneimine; chitosan polymers and mixtures thereof. Preferably, the wet strength resins are water-soluble cationic resins selected from the group consisting of polyamide-epichlorohydrin resins, glyoxalated polyacrylamide resins, polyethyleneimine resins, and mixtures thereof.

Polyamide-epichlorohydrin resins are cationic wet strength resins which have been found to be of particular utility. Suitable types of such resins are described in U.S. Pat. No. 3,700,623, issued on Oct. 24, 1972, and U.S. Pat. No. 3,772,076, issued on Nov. 13, 1973, both issued to Keim and both being hereby incorporated by reference. One commercial source of a useful polyamide-epichlorohydrin resin is Hercules, Inc. of Wilmington, Del., which markets such resins under the trademarks KYMENE™ 557H and KYMENE™ 555LX, with KYMENE™ 557H being preferred.

Preferably, the polyamide-epichlorohydrin resin comprises a water-soluble polymeric reaction product of epichlorohydrin, and a water-soluble polyamide having secondary amine groups. The ratio of epichlorohydrin to secondary amine groups of said polyamide is preferably from about 0.5 to 1 to about 2 to 1. Preferably, the water-soluble polyamide is derived from reacting a polyalkylene polyamine and a saturated aliphatic dibasic carboxylic acid containing from about 3 to 10 carbon atoms. Preferably the mole ratio of polyalkylene to dibasic carboxylic acid is from about 0.8 to 1 to about 1.5 to 1. Preferably the saturated aliphatic dibasic carboxylic acid is adipic acid and the polyakylene polyamine is diethylene triamine. Most preferably, the water-soluble polyamide contains recurring groups of the formula

—NH($C_nH_{2n}$HN)$_x$—CORCO— wherein n and x are each 2 or more and R is the divalent hydrocarbon radical of the dibasic carboxylic acid containing from about 3 to 10 carbon atoms. Resins of this type are commercially available under the trademarks KYMENE® (Hercules, Inc.) and CASCAMIDS® (Borden). An essential characteristic of these resins is that they are phase compatible with the polyvinyl alcohol, i.e., they do not phase-separate in the presence of aqueous polyvinyl alcohol.

Base-activated polyamide-epichlorohydrin resins useful in the present invention are also sold by Hercules, Inc. of Wilmington, Del., which markets such resin under the trademark KYMENE™ 450. Other examples of commercial sources of base-activated polyamide-epichlorohydrin resins are sold under the SANTO RES trademark, such as SANTO RES 31, by Monsanto Company of St. Louis, Mo. These types of materials are generally described in U.S. Pat. No. 3,855,158 issued to Petrovich on Dec. 17, 1974; U.S. Pat. No. 3,899,388 issued to Petrovich on Aug. 12, 1975; U.S. Pat. No. 4,129,528 issued to Petrovich on Dec. 12, 1978; U.S. Pat. No. 4,147,586 issued to Petrovich on Apr. 3, 1979; and U.S. Pat. No. 4,222,921 issued to Van Eenam on Sep. 16, 1980, all incorporated herein by reference.

Glyoxalated polyacrylamide resins have also been found to be of utility as wet strength resins. These resins are described in U.S. Pat. No. 3,556,932, issued on Jan. 19, 1971, to Coscia, et al. and U.S. Pat. No. 3,556,933, issued on Jan. 19, 1971, to Williams et al., both patents being incorporated herein by reference. One commercial source of polyacrylamide resins is American Cyanamid Co. of Stanford, Conn., which markets one such resin under the trademark PAREZ™ 631 NC.

Still other water-soluble cationic resins finding utility in this invention are urea formaldehyde and melamine formaldehyde resins. The more common functional groups of these polyfunctional resins are nitrogen containing groups such as amino groups and methylol groups attached to nitrogen. Polyethylenimine type resins may also find utility in the present invention.

By way of a nonlimiting example, the adhesive compositions of the present invention may comprise a polyvinyl alcohol solution or stable dispersion containing ten percent solids, and a KYMENE™ 557H solution containing 12.5 percent solids. Tap water supplied at ambient temperature is also provided. The adhesive is then made, in order from 40 parts polyvinyl alcohol, 8 parts KYMENE™ 557H, and 52 parts water. These constituents are added together in this order in a suitable container and mixed for roughly ten minutes using an impeller type mixture. Preferably the pH of the mixture is at least 7.0, to yield a proper cure rate.

This example provides an adhesive composition having five percent total solids, of which one percent is KYMENE and four percent is a polyvinyl alcohol adhesive. The adhesive may be applied to a ply at a total solids quantity of 3 to 85 grams per 3,000 square feet, preferably 4 to 48 grams per 3,000 square feet, and more preferably 6 to 20 grams per 3,000 square feet. For an adhesive composition having a constant amount total solids, as the amount of water-soluble cationic wet strength resin making up the constant total solids increases, generally a lesser quantity of the dry strength binder component may be applied to the ply. Alternatively stated, for a constant percentage of wet strength cationic resin relative to the dry strength binder material, as the quantity of total solids in the adhesive composition increases, the quantity of total solids applied to the ply generally increases.

A three-roll adhesive application system may be used to apply the adhesive. Using this system, adhesive is picked up as a film on the surface of a pickup roll. The adhesive film is then split in the nip between the pickup roll and a metering roll. The portion of the film remaining on the metering roll then transfers to an applicator roll where the adhesive film is again split. The film remaining on the applicator roll is applied to the embossments of the ply. The embossments of this ply are then brought in contact with another ply. The plies are adhesively joined together in the nip of conventional marrying rolls.

Of course, the adhesive may be applied to the embossments in any other manner as are well known in the art and is commonly used for nested or knob-to-knob embossing processes as well. Suitable adhesive application systems include flexographic, spray systems, gravure systems, as well as the three-roll system described above.

As the spacing and size of the protuberance decreases, a greater amount of adhesive may be applied to each protuberance for the embodiment described. The amount of adhesive may be increased either by using a relatively greater adhesive solids content in the adhesive composition, or by applying a larger quantity of the adhesive composition to the ply.

The resulting paper product according to the present invention comprises a laminate of two or more plies. Preferably, the paper product according to the present invention is a paper towel having a wet ply bond strength of at least 4.5 grams per inch, and more preferably at least 5.0 grams per inch.

Preferably the paper product according to the present invention further has a alkaline wet ply bond strength of at least 4.5, and more preferably at least 5.0 grams per inch. Alkaline wet ply bond strength provides the benefit that if the paper product according to the present invention is used with certain commercially available cleaning products, the plies will remain joined together as a unitary laminate.

The resulting paper product also preferably has a dry ply bond strength of 4.0 to 20.0 grams per inch, and more preferably 5.0 to 15.0 grams per inch. Wet and dry ply bond strengths are measured as follows.

Dry Ply Bond Strength

Samples of four finished paper products are provided. One three inch strip running the entire length of the sample is cut from the center of each sample. Two of the strips are cut in the machine direction and the other two are cut in the cross machine direction (i.e., between perforations in the machine direction or between edges in the cross machine direction). The strips are separated slightly along either of the three inch edges, so that each ply is available independent of the other. The plies are manually separated until the sample has a gage length of two inches.

Each ply is placed in the jaw of a tensile machine. A suitable tensile tester is a Model 1451-24 supplied by the Thwing/Albert Corporation of Philadelphia, Penn. The crosshead separation speed is set at 20 inches per minute and travels 7.5 inches from an initial separation of 2.0 inches. Data is only recorded for the last six inches of crosshead travel. All four samples are tested in tension. The four numbers are then averaged to give a single ply bond strength representative of the product from which all four samples were taken.

Care must be taken that the portion of the sample yet to be separated by the tensile machine does not contact the lower jaw or the lower crosshead of the tensile machine. If such contact occurs, it will register on the load cell and give a reading which is erroneously high. Similarly, care must be taken that the portion of the sample yet to be separated does not contact the portion of the sample having the plies already separated by the tensile tester. If such contact occurs, it will falsely increase the apparent ply bond strength. If either of the aforementioned contacts occur, the data point is to be discarded and a new sample tested.

Wet Ply Bond Strength

A single sample of the paper product is provided. The sample is aged at least two weeks after converting, in order to allow adequate cure time for the adhesive composition.

A three inch strip is cut from the center of the sample in the machine direction. The strip runs the entire machine direction length of the sample (e.g., between perforations).

The plies are separated along one of the three inch edges of the sample. The portion of the sample which has not been separated, i.e., the portion which is not to be placed in the jaws of the tensile machine, is immersed in distilled water. After immersion, the sample is immediately removed from the water and allowed to drain for 60 seconds on a draining rack. The draining rack is provided with a nylon wire square mesh. The wires forming the mesh are 0.015 inches diameter on a pitch of 0.25 inches. The drying rack is oriented at an angle of 45 degrees relative to the horizontal. While drying on the drying rack, the sample is oriented so that the longer edges of the sample are downwardly aligned with the slope of the drying rack. The separated edges of the ply are brought back together in the drying rack so that the sample is as smooth as possible, and the sample properly drains excess water. After having been prepared in this manner, the sample is then tested in the tensile machine as described above for the dry ply bond strength.

A nonlimiting example of one paper product made according to the present invention is illustrated below. The paper products made from two plies of cellulosic fibers as is commonly used in BOUNTY brand paper towels marketed by The Procter & Gamble Company of Cincinnati, Ohio and the assignee of the present invention. Each ply is made of 65 percent northern softwood Kraft, 35 percent CTMP, and has a basis weight of 14 pounds per 3,000 square feet. Each ply is embossed in a nested embossing process by elliptically shaped protuberances having at the distal end a major axis of 0.076 inches, a minor axis of 0.038 inches and a protuberance height of 0.070 inches. The protuberances are spaced in a two/three complementary concentric diamond pattern on a 45 degree pitch of about 0.118 inches. The protuberances comprise about 10 percent of the area of each ply. Two complementary plies are made and joined together at a zero clearance marrying nip, so that a unitary laminate having 42±3 protuberances per square inch per ply is formed.

An adhesive composition, prepared as described above, is applied to the protuberances of one ply. The total solids of the adhesive composition is applied to the paper product in a quantity of about 8 grams per 3,000 square feet using a three roll system. The resulting paper product has a wet ply bond strength of 5.4 grams per inch and a dry ply bond strength of 9.1 grams per inch.

In Table I paper towel products according to the present invention are compared to other commercially available paper towels. Referring to Table I, the towel of Embodiment 1 includes an adhesive composition comprising 95.0 percent water and 5.0 percent total solids. Of the 5.0 percent total solids, 4.0 percent of this total is EVANOL 71-30 polyvinyl alcohol while the remaining 1.0 percent is KYMENE 557H wet strength resin. The paper towel of Embodiment 1 was aged for two weeks after converting. The towel of Embodiment 2 includes an adhesive composition comprising 94.0 percent water and 6.0 percent total solids. Of the 6.0 percent total solids, 4.8 percent is EVANOL 71-30 polyvinyl alcohol while the remaining 1.2 percent is KYMENE 557H wet strength resin. The paper towel of Embodiment 2 was aged for three weeks after converting. The paper towel sold by the instant assignee as BOUNTY, includes an adhesive composition comprising from 95 percent to 96 percent water and from 4.0 percent to 5.2 percent polyvinyl alcohol.

TABLE I

| BRAND | COMPANY/PLANT | WET PLY BOND STRENGTH | DRY PLY BOND STRENGTH |
|---|---|---|---|
| Embodiment 1 | Assignee | 5.4 | 9.1 |
| Embodiment 2 | Assignee | 6.0 | 11.7 |
| Bounty | Assignee | 3.7 | 14.7 |
| Brawny | James River | 3.1 | 10.1 |
| Sparkle | Georgia Pacific | 3.0 | 7.0 |
| Mardis Gras | Ft. Howard | 3.4 | 7.6 |
| Viva 2-ply | Scott | 3.0 | 4.4 |
| Hi-Dri | Kimberly Clark | 3.4 | 5.5 |

Each of the wet and dry ply bond strengths in Table I represents an average of five samples. Of course, for the dry ply bond strength test, each of the five samples represents an average of four test specimens.

Variations in the disclosed structure are feasible. For example, one of the plies may be embossed and the other ply not embossed. Alternatively, neither ply may be embossed. In this embodiment, the two plies are joined together by discrete or continuous deposits of adhesive. Both the adhesively joined areas and the non-adhesively joined areas of each ply would lie within the plane of that ply.

It will be apparent to one skilled in the art that other embodiments and executions are feasible, all of which are within the scope of the appended claims.

What is claimed is:

1. A multi-ply cellulosic paper product having improved wet ply bond strength, said multi-ply paper product comprising at least two macroscopically monoplanar plies joined together in face-to-face relationship, said plies being joined to one another using an aqueous adhesive composition, said aqueous adhesive composition comprising a mixture of:
    (a) from about 2% to about 6% by weight of a water-soluble or water-dispersible dry strength binder material selected from the group consisting of polyvinyl alcohol, starch based resins and mixtures thereof;
    (b) from about 1% to about 9% by weight of a water-soluble cationic resin selected from the group consisting of polyamide-epichlorohydrin resins, glyoxalated polyacrylamide resins, polyethyleneimine resins, and mixtures thereof; and
    (c) from about 89% to about 95% by weight water, wherein the total solids content of said aqueous adhesive composition ranges from about 5% to about 11% by weight, said solids content being the combined weight percents of said water-soluble or dispersible dry strength binder material and said water-soluble cationic resin.

2. The paper product of claim 1 wherein said aqueous adhesive composition is applied to said paper product at a level of from about 3 to about 85 grams per 3,000 square feet.

3. The paper product of claim 2 wherein said water-soluble or dispersible dry strength binder material is polyvinyl alcohol and wherein said water-soluble cationic resin is a polyamide-epichlorohydrin resin.

4. The paper product of claim 3 wherein at least one of said plies has embossments thereon, said embossments extending outwardly from the plane of said ply towards and contacting said opposite ply, said plies being joined together at said embossments.

5. The paper product of claim 4 having two plies, wherein each of two said plies has embossments protruding towards and contacting said other ply.

6. The paper product of claim 5 having adhesive applied to the embossments of at least one ply.

7. The paper product of claim 6 having adhesive applied to the embossments of both plies.

8. The paper product of claim 6 wherein said polyamide-epichlorohydrin resin comprises the reaction product of an epichlorohydrin and a polyamide containing secondary amine groups, the ratio of epichlorohydrin to secondary amine groups of said polyamide being from about 0.5 to 1 to about 2 to 1.

9. The paper product of claim 8 wherein said polyamide containing secondary amine groups contains recurring groups having the formula:

$$-\mathrm{NH}(C_nH_{2n}HN)_x-\mathrm{CORCO}-$$

wherein n and x are each 2 or more and R is a divalent hydrocarbon radical of a dibasic carboxylic acid containing from about 3 to about 10 carbon atoms.

10. The paper product of claim 8 wherein said polyamide containing secondary amine groups is obtained by reacting a C3–C10 saturated aliphatic dibasic carboxylic acid and a polyalkylene polyamine in a mole ratio of polyalkylene to dibasic carboxylic acid of from about 0.8 to 1 to about 1.5 to 1.

11. The paper product of claim 10 wherein said saturated aliphatic dibasic carboxylic acid is adipic acid.

12. The paper product of claim 11 wherein said polyalkylene polyamine is diethylene triamine.

13. The paper product of claim 6 wherein said aqueous adhesive composition comprises:
    (a) from about 3.5% to about 6% by weight of said water-soluble or dispersible polyvinyl alcohol;
    (b) from about 1% to about 3% by weight of said water-soluble polyamide-epichlorohydrin resin; and
    (c) from about 92% to about 95% by weight water, wherein the total solids content of said aqueous adhesive composition ranges from about 5% to about 8%, by weight.

14. The paper product of claim 1 having three plies joined in face-to-face relationship.

15. The paper product of claim 1 wherein said paper product is a paper towel having a wet ply bond strength of at least 4.5 grams per inch.

* * * * *